(12) United States Patent
Wang et al.

(10) Patent No.: US 11,812,496 B2
(45) Date of Patent: Nov. 7, 2023

(54) USER GROUP SESSION MANAGEMENT METHOD AND APPARATUS

(71) Applicant: Huawei Technologies Co., Ltd., Shenzhen (CN)

(72) Inventors: Yuan Wang, Shanghai (CN); Zhongping Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 242 days.

(21) Appl. No.: 17/172,708

(22) Filed: Feb. 10, 2021

(65) Prior Publication Data

US 2021/0168902 A1  Jun. 3, 2021

Related U.S. Application Data

(63) Continuation of application No. PCT/CN2019/100497, filed on Aug. 14, 2019.

(30) Foreign Application Priority Data

Aug. 14, 2018 (CN) .......................... 201810924641.4

(51) Int. Cl.
*G06F 15/16* (2006.01)
*H04W 76/40* (2018.01)
(Continued)

(52) U.S. Cl.
CPC .......... *H04W 76/40* (2018.02); *H04L 65/403* (2013.01); *H04L 67/141* (2013.01); *H04W 76/11* (2018.02)

(58) Field of Classification Search
None
See application file for complete search history.

(56) References Cited

U.S. PATENT DOCUMENTS

2011/0103283 A1  5/2011  Kale et al.
2011/0228776 A1*  9/2011  Duncan .............. H04Q 11/0478
370/392

(Continued)

FOREIGN PATENT DOCUMENTS

CN  103428636 A  12/2013
CN  103609147 A  2/2014

(Continued)

OTHER PUBLICATIONS

3GPP TS 22.261 V16.4.0, "3rd Generation Partnership Project, Technical Specification Group Services and System Aspects; Service requirements for the 5G system; Stage 1 (Release 16)," Jun. 2018, 55 pages.

(Continued)

*Primary Examiner* — Atta Khan
(74) *Attorney, Agent, or Firm* — Conley Rose, P.C.

(57) ABSTRACT

A user group session management method includes receiving, by a session management network element from a mobility management network element, a first message for requesting to establish a user group session for a first terminal, where the first message comprises an identifier of the first terminal and an identifier of a user group, generating, by the session management network element based on the identifier of the user group, a routing forwarding policy for the first terminal, and sending, by the session management network element, a second message to a user plane network element, where the second message indicates the user plane network element to establish a first session for the first terminal, and the second message carries the routing forwarding policy.

20 Claims, 6 Drawing Sheets

(51) Int. Cl.
*H04W 76/11* (2018.01)
*H04L 65/403* (2022.01)
*H04L 67/141* (2022.01)

(56) References Cited

U.S. PATENT DOCUMENTS

| | | | |
|---|---|---|---|
| 2015/0229677 | A1 | 8/2015 | Gu et al. |
| 2017/0111219 | A1* | 4/2017 | Saltsidis ............... H04L 45/245 |
| 2017/0303259 | A1 | 10/2017 | Lee et al. |
| 2018/0167786 | A1 | 6/2018 | Wu et al. |
| 2020/0170055 | A1 | 5/2020 | Dou et al. |
| 2021/0100047 | A1 | 4/2021 | Chiba et al. |

FOREIGN PATENT DOCUMENTS

| | | |
|---|---|---|
| CN | 105657669 A | 6/2016 |
| CN | 107690126 A | 2/2018 |
| CN | 108370600 A | 8/2018 |
| EP | 3499919 A1 | 6/2019 |
| RU | 2498528 C1 | 11/2013 |
| WO | 2014001463 A2 | 1/2014 |
| WO | 2017024470 A1 | 2/2017 |
| WO | 2017218775 A1 | 12/2017 |
| WO | 2018030474 A1 | 2/2018 |

OTHER PUBLICATIONS

3GPP TS 23.501 V15.2.0, "3rd Generation Partnership Project; Technical Specification Group Services and System Aspects; System Architecture for the 5G System; Stage 2 (Release 15)," Jun. 2018, 216 pages.

3GPP TS 23.502 V15.2.0, "3rd Generation Partnership Project; Technical Specification Group Services and System Aspects; Procedures for the 5G System; Stage 2 (Release 15)," Jun. 2018, 308 pages.

3GPP TS 29.244 V15.2.0, "3rd Generation Partnership Project; Technical Specification Group Core Network and Terminals; Interface between the Control Plane and the User Plane Nodes; Stage 3 (Release 15)," Jun. 2018, 176 pages.

Huawei et al., "Solution for K1 and K2: Packet Aggregation for Small Data Delivery," SA WG2 Meeting #127-Bis, S2-185331, Newport Beach, CA, USA, May 28-Jun. 1, 2018, 10 pages.

Huawei et al., "Solution for KI 1 and KI 2: Packet Aggregation for Small Data Delivery," SA WG2 Meeting #128, S2-187234, Jul. 2-6, 2018, Vilnius, Lithuania, 10 pages.

Huawei et al., "Group management configured for multiple MC services," 3GPP TSG-SA WG6 Meeting #14, S6-161424, Reno, Nevada, USA, Nov. 14-18, 2016, 4 pages.

* cited by examiner

USER GROUP SESSION MANAGEMENT
METHOD AND APPARATUS

CROSS-REFERENCE TO RELATED
APPLICATIONS

This application is a continuation of International Patent Application No. PCT/CN2019/100497 filed on Aug. 14, 2019, which claims priority to Chinese Patent Application No. 201810924641.4 filed on Aug. 14, 2018. The disclosures of the aforementioned applications are hereby incorporated by reference in their entireties.

TECHNICAL FIELD

Embodiments of this application relate to the field of mobile communications technologies, and in particular, to a user group establishment method and an apparatus.

BACKGROUND

At present, an Internet Protocol (IP) service provided by a traditional 3rd Generation Partnership Project (3GPP) uses a server-client mode, and implements mutual communication between clients using agent forwarding of a server. For example, for a WECHAT application, a user A sends a WECHAT message to a user B using a 3GPP network, the 3GPP network first sends an IP data packet (including the WECHAT message) of the user A to a WECHAT application server outside the 3GPP network, and the WECHAT application server determines that the WECHAT message is sent to the user B, and then sends the IP data packet to the user B using the 3GPP network again, to implement mutual communication between the user A and the user B.

With development of communications technologies, a virtual local area network (LAN) service needs to be supported in a 5th generation (5G) network. That is, the 3GPP network needs to provide a plurality of types of transmission services for terminals in a set. For example, the services include an IP service, an Ethernet-based service, or a service based on another non-IP technology, to ensure mutual communication between the terminals in the set. That is, using the virtual LAN service, the 3GPP network implements mutual communication between the user A and the user B, for example, functions such as file sharing between personal computers (PCs) and online neighbor discovery, without needing deployment and participation of an external application server. A problem is how to establish and manage a virtual LAN service session for UE, and implement routing of mutual communication between UEs within a 3GPP network, without depending on deployment and participation of an external application server.

SUMMARY

Embodiments of this application provide a user group session management method and an apparatus, to manage a user group session.

According to a first aspect, an embodiment of this application provides a user group establishment method. The method includes receiving, by a session management network element, a first message sent by a mobility management network element, where the first message carries an identifier of a first terminal and an identifier of a user group, and the first message is used to request to establish, for the first terminal, a user group session corresponding to the identifier of the user group, generating, by the session management network element based on the identifier of the user group, a routing forwarding policy for the first terminal, and sending, by the session management network element, a second message to a user plane network element, where the second message is used to instruct the user plane network element to establish a first session for the first terminal, and the second message carries the routing forwarding policy.

In the foregoing technical solution, the session management network element instructs the user plane network element to establish the first session for the first terminal and generate the routing forwarding policy for the first terminal. This can implement routing of communication between terminals of the user group within a 3GPP network, without depending on deployment and participation of an external application server.

With reference to the first aspect, in some implementations of the first aspect, the first message is a protocol data unit (PDU) session establishment request message.

With reference to the first aspect, in some implementations of the first aspect, generating, by the session management network element based on the identifier of the user group, a routing forwarding policy for the first terminal includes obtaining, by the session management network element based on the identifier of the user group, a second terminal list of the user group from local information, where the second terminal list includes one or more second terminals, and the second terminal is a group member of the user group, and generating, by the session management network element based on the second terminal list, the routing forwarding policy for the first terminal.

With reference to the first aspect, in some implementations of the first aspect, generating, by the session management network element based on the identifier of the user group, a routing forwarding policy for the first terminal includes sending, by the session management network element, a third message to a user group management network element, where the third message carries the identifier of the user group, used to request group member information of the user group, receiving, by the session management network element, the second terminal list returned by the user group management network element, where the second terminal list includes one or more second terminals, and the second terminal is a group member of the user group, and generating, by the session management network element based on the second terminal list, the routing forwarding policy for the first terminal.

With reference to the first aspect, in some implementations of the first aspect, generating, by the session management network element based on the second terminal list, the routing forwarding policy for the first terminal includes obtaining, by the session management network element based on the second terminal list, a second session corresponding to the second terminal, and generating the routing forwarding policy, where the routing forwarding policy is used to instruct the user plane network element to send, to the second terminal using the second session, data that is from the first terminal and that is received from the first session, and/or send, to the first terminal using the first session, data that is from the second terminal and that is received from the second session.

With reference to the first aspect, in some implementations of the first aspect, the first message further carries user group verification information of the first terminal, used to verify the first terminal such that the third message sent by the session management network element to the user group management network element further carries the user group verification information of the first terminal, and the method further includes receiving, by the session management network element, indication information from the user group management network element, where the indication information is used to indicate that the first terminal is an authorized user of the user group.

According to a second aspect, a user group session management method is provided. The method includes receiving, by a user group management network element, a third message from a session management network element, where the third message carries an identifier of a user group, used to request group member information of the user group, obtaining, by the user group management network element, the second terminal list based on the identifier of the user group, where the second terminal list includes one or more second terminals, and the second terminal is a group member of the user group, and sending the second terminal list to the session management network element for managing a user group session.

With reference to the second aspect, in some implementations of the second aspect, the third message further carries user group verification information of a first terminal, and the method further includes determining, by the user group management network element based on the user group verification information of the first terminal, that the first terminal is an authorized user of the user group, and sending indication information to the session management network element, where the indication information is used to indicate that the first terminal is the authorized user of the user group.

According to a third aspect, a communications device is provided. The communications device is configured to perform the method according to any one of the first aspect or the possible implementations of the first aspect. Further, the device includes the units configured to perform the method according to any one of the first aspect or the possible implementations of the first aspect.

According to a fourth aspect, another communications device is provided. The communications device is configured to perform the method according to any one of the second aspect or the possible implementations of the second aspect. Further, the device includes the units configured to perform the method according to any one of the second aspect or the possible implementations of the second aspect.

According to a fifth aspect, a communications device is provided. The device includes a transceiver and a processor. The transceiver communicates with the processor using an internal connection path. The processor is configured to control a receiver to receive a signal and control a transmitter to send a signal. Optionally, the communications device further includes a memory. The transceiver, the memory, and the processor communicate with each other using an internal connection path, the memory is configured to store an instruction, and the processor is configured to execute the instruction stored in the memory, to control the receiver to receive a signal and control the transmitter to send a signal such that the device performs the method according to any one of the first aspect or the possible implementations of the first aspect.

According to a sixth aspect, a communications device is provided. The device includes a transceiver and a processor. The transceiver communicates with the processor using an internal connection path. The processor is configured to control a receiver to receive a signal and control a transmitter to send a signal. Optionally, the communications device further includes a memory. The transceiver, the memory, and the processor communicate with each other using an internal connection path, the memory is configured to store an instruction, and the processor is configured to execute the instruction stored in the memory, to control the receiver to receive a signal and control the transmitter to send a signal such that the device performs the method according to any one of the first aspect or the possible implementations of the first aspect.

According to a seventh aspect, an embodiment of this application provides a communications system. The communications system includes one or more of a session management network element and a user group management network element.

The session management network element is configured to perform the method according to any one of the first aspect or the possible designs of the first aspect, or the method performed by a transmission agent in the solutions provided in the embodiments of this application. The user group management network element is configured to perform the method according to any one of the second aspect, a service instance that can be used to perform the second aspect, or the possible implementations of the second aspect, the method according to any one of the third aspect or the possible implementations of the third aspect, or the method performed by the service instance in the solutions provided in the embodiments of this application.

In a possible implementation, the system further includes another device that interacts with any device in the session management network element and the user group management network element in the solution provided in this embodiment of this application, for example, a mobility management network element and/or a user plane network element.

According to an eighth aspect, a computer program product is provided. The computer program product includes computer program code, where when the computer program code is run by a computer, the computer is enabled to perform the method according to any possible implementation of any one of the foregoing aspects.

According to a ninth aspect, a computer-readable medium is provided and is used to store a computer program. The computer program includes an instruction used to perform the method according to any possible implementation of any one of the foregoing aspects.

According to a tenth aspect, a communications chip is provided. The communications chip stores an instruction, and when the instruction is run on a computer device, the communications chip is enabled to perform the method according to any possible implementation of any one of the foregoing aspects.

In addition, for technical effects brought by any implementation according to the second aspect to the tenth aspect, refer to technical effects brought by different implementations according to the first aspect. Details are not described herein again.

These aspects or other aspects in the embodiments of this application are clearer and more comprehensible in descriptions of the following embodiments.

DESCRIPTION OF EMBODIMENTS

The following further describes in detail the embodiments of this application with reference to accompanying drawings.

A specific operation method in method embodiments may also be applied to an apparatus embodiment or a system embodiment. In the descriptions of the embodiments of this application, "at least one" means one or more, and "a plurality of" means two or more. The term "and/or" is used to describe an association relationship between associated objects, and indicates that three relationships may exist. For example, "A and/or B" may indicate the following three cases: only A exists, only B exists, and both A and B exist, where A and B may be singular or plural. The character "/" generally indicates an "or" relationship between the associated objects. "At least one of the following" or a similar expression thereof indicates any combination of the following, including any combination of one or more of the following. For example, at least one of a, b, or c may indicate a, b, c, "a and b", "a and c", "b and c", or "a, b, and c", where a, b, and c may be singular or plural.

A communication method provided in the embodiments of this application may be applied to a plurality of system architectures. A network architecture and a service scenario described in the embodiments of this application are intended to describe the technical solutions in the embodiments of this application more clearly, and do not constitute a limitation to the technical solutions provided in the embodiments of this application. A person of ordinary skill in the art may know that with evolution of the network architecture and emergence of new service scenarios, the technical solutions provided in the embodiments of this application are also applicable to similar technical problems.

Figure 1:
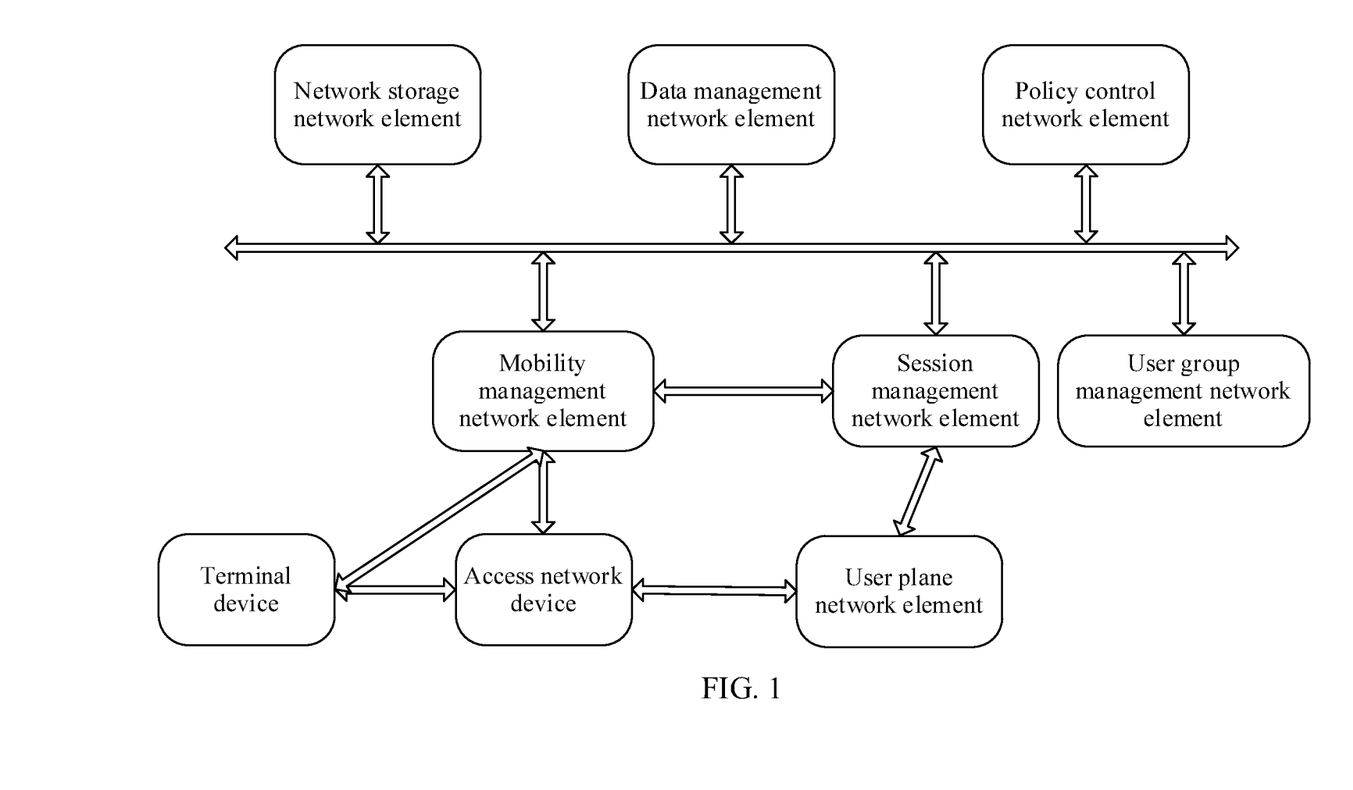
FIG. 1 is a schematic diagram of a possible network architecture according to an embodiment of this application.

FIG. 1 is a schematic diagram of a possible network architecture to which an embodiment of this application is applicable. The network architecture may include devices such as a terminal device, an access network device, a mobility management network element, a session management network element, a network storage network element, a data management network element, a policy control network element, a user group management network element, and a user plane network element.

The terminal device is a device having a wireless transmission/reception function, and may be deployed on the land, such as an indoor device, an outdoor device, a handheld device, or a vehicle-mounted device, may be deployed on the water (for example, in a steamship), or may be deployed in the air (for example, on an airplane, on a balloon, or on a satellite). The terminal device may be a mobile phone, a tablet computer, a computer having wireless transmission and reception functions, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like.

The radio access network (RAN) device is a device that provides a wireless communication function for a terminal. For example, the access network device includes but is not limited to a next generation NodeB (gNB), an evolved NodeB (eNB), a radio network controller (RNC), a NodeB (NB), a base station controller (BSC), a base transceiver station (BTS), a home base station (for example, a home eNB, or a home node B (HNB)), a baseband unit (BBU), a transmission reception point (TRP), a transmission point (TP), a mobile switching center, and the like in 5G.

The mobility management network element is mainly used for mobility management, for example, user location update, a user registration network, and user handover, in a mobile network. In a 5G communications system, the mobility management network element may be an access and mobility management function (AMF) network element, Namf is a service-based interface provided by an AMF, and the AMF may communicate with another network function using the Namf. In future communication such as 6th generation (6G) communication, the mobility management network element may still be an AMF network element. Alternatively, the mobility management network element may have another name. This is not limited in this embodiment of this application.

The session management network element is mainly used for session management, for example, session establishment, modification, or release, in a mobile network. A specific function is, for example, allocating an IP address to a user, or selecting a user plane network element that provides a packet forwarding function. In a 5G system, the session management network element may be a session management function (SMF) network element, Nsmf is a service-based interface provided by an SMF, and the SMF may communicate with another network function using the Nsmf. In the future communication such as 6G communication, the session management network element may still be an SMF network element. Alternatively, the session management network element may have another name. This is not limited in this embodiment of this application.

The network storage network element is configured to store a network function entity and description information of a service provided by the network function entity, support service discovery, network element entity discovery, and the like. In 5G communication, the network storage network element may be a network repository function (NRF) network element, Nnrf is a service-based interface provided by an NRF, and the NRF may communicate with another network function using the Nnrf. In the future communication such as the 6G communication, the network repository network element may still be an NRF network element. Alternatively, the network repository network element may have another name. This is not limited in this embodiment of this application.

The data management network element is configured to process a user identifier, access authentication, registration, mobility management, or the like. In the 5G communication, the data management network element may be a unified data management (UDM) network element. Nudm is a service-based interface provided by a UDM, and the UDM may communicate with another network function using Nudm. In the future communication such as the 6G communication, the data management network element may still be a UDM network element. Alternatively, the data management network element may have another name. This is not limited in this embodiment of this application.

The policy control network element is configured to guide a unified policy framework of network behavior, and provide policy rule information, and the like for a control plane function network element (such as an AMF or an SMF). In the 5G communication, the policy control network element may be a policy control function (PCF) network element. Npcf is a service-based interface provided by a PCF, and the PCF may communicate with another network function using Npcf. In the future communication such as the 6G communication, the policy control network element may still be a PCF network element. Alternatively, the policy control network element may have another name. This is not limited in this embodiment of this application.

The user group management network element may be configured to establish and manage a user group including a plurality of terminals, for example, allocate an identifier of the user group, establish an association between the identifier of the user group and an identifier of the terminal, and obtain user group authentication information. For example, the user group management network element may be a LAN service management function (LSMF), a group management function (GMF), or a unified data management function. This is not limited in the present disclosure. It should be noted that the user group management function network element may be an independent network element, or may be a function module of an existing network element, including but not limited to a function template of an existing AMF network element, a function template of a PCF network element or a function template of an SMF network element.

The user plane network element is mainly configured to forward a user data packet according to a routing rule of the session management network element. In the 5G communications system, the user plane network element may be a user plane function (UPF) network element. In the future communication such as the 6G communication, the user plane network element may still be a UPF network element. Alternatively, the user plane network element may have another name. This is not limited in this embodiment of this application.

Figure 2:
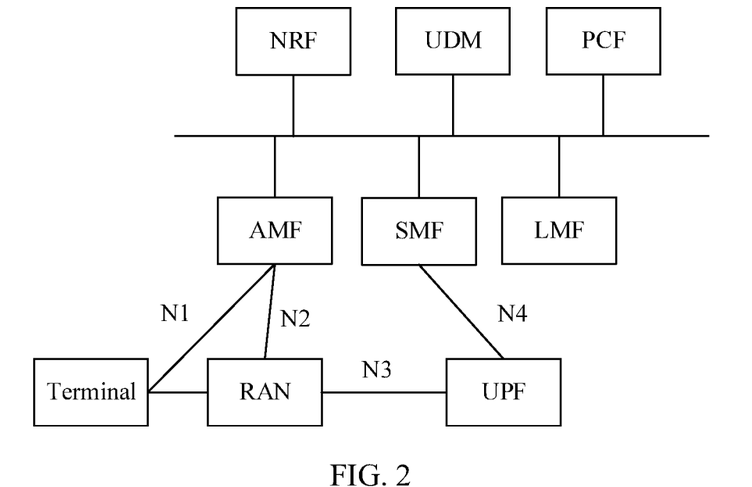
FIG. 2 is a schematic diagram of another possible network architecture according to an embodiment of this application.

FIG. 2 is a schematic diagram of a specific possible network architecture to which an embodiment of this application is applicable. A 5G communications system is used as an example and includes a terminal, a RAN, an AMF, an SMF, an NRF, a UPF, and an LSMF. An N1 interface in FIG. 2 is a reference point between UE and the AMF, an N2 interface is a reference point between the RAN and the AMF and is configured to send a non-access stratum (NAS) message, a Next Generation Application Protocol (NGAP) message, and the like, an N3 interface is a reference point between the RAN and the UPF and is configured to transmit user plane data and the like, an N4 interface is a reference point between the SMF and the UPF and is configured to transmit information such as identification information of a tunnel connected to the N3 interface, data buffering indication information, and a downlink data notification message, and an N6 interface is a reference point between the UPF and a Data Network (DN) and is configured to transmit user plane data and the like.

It may be understood that the foregoing functions may be network elements in a hardware device, software functions that are run on dedicated hardware, or virtualized functions instantiated on a platform (for example, a cloud platform).

Based on FIG. 1 or FIG. 2, the following describes the user group session management method provided in the embodiments of this application.

It should be noted that the embodiments of this application are not limited to the system architecture shown in FIG. 1 and FIG. 2, and may be further applied to another future communications system, for example, a 6G communications system architecture. In addition, in the embodiments of this application, names of the foregoing used network elements may be changed while functions of the network elements may remain the same in a future communications system.

For ease of description, in subsequent embodiments of the embodiments of this application, the LSMF network element, the AMF network element, the UPF network element, the SMF network element are respectively referred to as the LSMF, the AMF, the UPF, and the SMF for short. It may be understood that, all LSMFs described subsequently in the embodiments of this application may be replaced with user group management network elements, all AMFs may be replaced with mobility management network elements, all UPFs may be replaced with user plane network elements, and all SMFs may be replaced with session management network elements.

Figure 3:
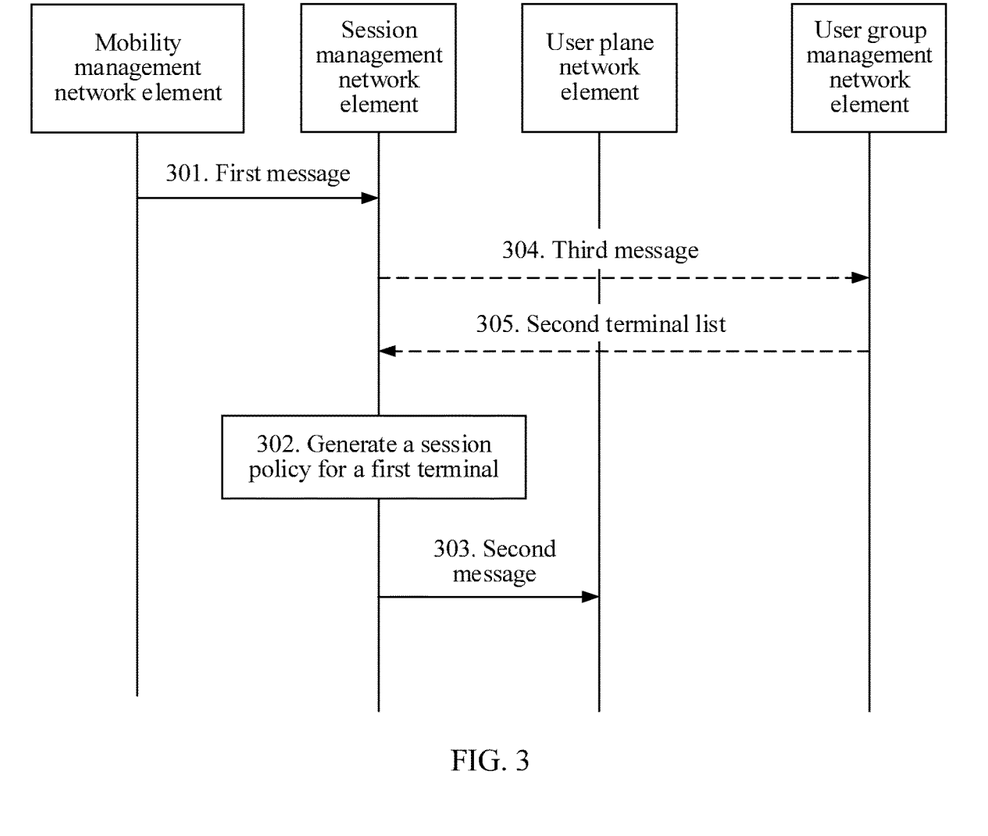
FIG. 3 is a flowchart of a user group establishment method according to an embodiment of this application.

Based on the network architecture in FIG. 1, FIG. 3 shows a user group session management method according to an embodiment of this application. The method includes the following steps.

Step 301. A session management network element receives a first message sent by a mobility management network element, where the first message carries an identifier of a first terminal and an identifier of a user group, and the first message is used to request to establish, for the first terminal, a user group session corresponding to the identifier of the user group.

The identifier of the user group may be any information that can be used to identify the user group. For example, the identifier (ID) of the user group may be a 5G LAN group ID, or a virtual network ID, or a virtual DN Name (DNN), or other identification information that can be used to represent a group including a group of UEs.

Further, the first message may be a PDU session establishment request message. The first message may further include a NAS message.

In a possible implementation, the identifier of the first terminal may be located in the PDU session establishment request message, and the identifier of the user group may be located in the NAS message. For example, the PDU session establishment request message (the identifier of the first terminal, the NAS message (the identifier of the user group, . . . ) . . . ).

In another possible implementation, both the identifier of the first terminal and the identifier of the user group may be located in the PDU session establishment request message. For example, the PDU session establishment request message (the identifier of the first terminal, the identifier of the user group, the NAS message ( . . . ), . . . ).

In still another possible implementation, both the identifier of the first terminal and the identifier of the user group may be located in the NAS message. For example, the PDU session establishment request message (the NAS message (the identifier of the first terminal, the identifier of the user group, . . . ), . . . ).

Step 302. The session management network element generates, based on the identifier of the user group, a routing forwarding policy for the first terminal.

The routing forwarding policy is used to instruct the user plane network element how to forward a user plane packet. The routing forwarding policy corresponds to the identifier of the user group, that is, a user plane packet of a terminal belonging to the user group needs to be forwarded based on the routing forwarding policy.

That the session management network element generates, based on the identifier of the user group, a routing forwarding policy for the first terminal may be implemented in any one of the following manners.

Manner 1. The session management network element obtains, based on the identifier of the user group, a second terminal list of the user group from local information, and the session management network element generates, based on the second terminal list, the routing forwarding policy for the first terminal.

Manner 2. The session management network element sends a third message to a user group management network element (as shown in step 304), where the third message carries an identifier of a user group, used to request group member information of the user group, the session management network element receives the second terminal list returned by the user group management network element (as shown in step 305), and the session management network element generates, based on the second terminal list, the routing forwarding policy for the first terminal.

That the session management network element generates, based on the second terminal list, a routing forwarding policy for the first terminal includes obtaining, based on the second terminal list, a second session corresponding to a second terminal (where there are a plurality of second terminals, there are a plurality of corresponding second sessions), and associating the second session with a first session, where the routing forwarding policy is a local exchange policy indicating that the user plane network element sends, to the second terminal using the second session, data that is from the first terminal and that is received from the first session, and/or send, to the first terminal using the first session, data that is from the second terminal and that is received from the second session.

Step 303. The session management network element sends a second message to the user plane network element, where the second message is used to instruct the user plane network element to establish the first session for the first terminal, and the second message carries the routing forwarding policy.

Step 304. The user plane network element establishes, based on the second message, the first session for the first terminal, and sends, based on the routing forwarding policy to the second terminal using the second session, the data that is from the first terminal and that is received from the first session, or sends, based on the routing forwarding policy to the first terminal using the first session, the data that is from the second terminal and that is received from the second session.

Optionally, the first message in step 301 may further include user group verification information of the first terminal, for example, a security certificate, used by the LSMF to verify the first terminal and determine whether the first terminal is an authorized user of the user group. In step 304 in Manner 2 in step 302, the third message may further carry the user group verification information. In step 305, the session management network element receives indication information from the user group management network element, and the indication information is used to indicate that the first terminal is the authorized user of the user group.

In the foregoing technical solution, the session management network element instructs the user plane network element to establish the first session for the first terminal and generate the routing forwarding policy for the first terminal. This can implement routing of communication information between terminals of the user group within a 3 GPP network, without depending on deployment and participation of an external application server.

Figure 4:
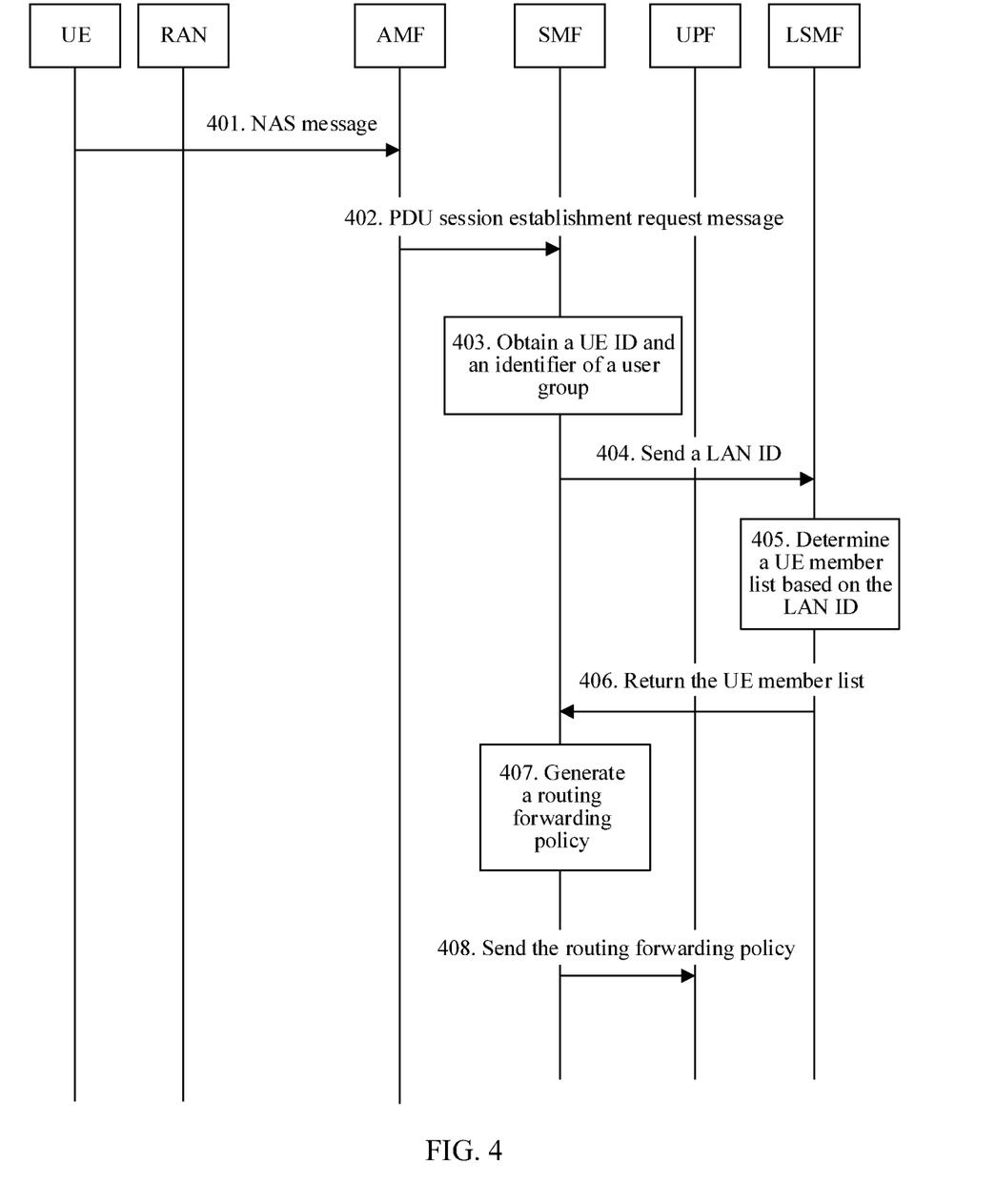
FIG. 4 is a flowchart of another user group establishment method according to an embodiment of this application.

With reference to a specific embodiment in FIG. 4, the following describes in detail the communication method in the foregoing Embodiment 3 using an example.

FIG. 4 is a schematic diagram of another communication method according to an embodiment of this application. When a terminal device registers with a network, that a network side provides, for the terminal device, a user plane connection security context required when the terminal device accesses a UCF includes the following steps.

Step 401. UE sends a NAS message to an AMF, where the message includes a UE ID and a LAN service session establishment request. Optionally, the LAN service session establishment request includes an identifier of a user group.

The identifier of the user group may be, for example, a 5G LAN group ID, or a virtual network ID, or a virtual DNN, or other identification information that can be used to represent a group including a group of UEs.

Step 402. The AMF sends a PDU session establishment request message to an SMF, where the PDU session establishment request message includes the UE ID and the identifier of the user group. The PDU session establishment request message includes the foregoing LAN service session establishment request. The AMF may query, using the UE ID, the user group to which the UE belongs from a user group management network element, and obtain the identifier of the user group. A correspondence between the UE ID and the user group is stored in the user group management network element.

Step 403. The SMF receives the PDU session establishment request message sent by the AMF, and obtains the UE ID and the identifier of the user group. Optionally, the SMF may obtain the identifier of the user group from the LAN service session establishment request, and obtain the UE ID from the PDU session establishment request message.

Step 404. The SMF sends an LAN ID to an LSMF (the SMF determines, based on the LAN service session establishment request or the LAN ID, that the UE initiates LAN session establishment, and the SMF determines that the SMF needs to communicate with the LSMF). Optionally, the message further includes the UE ID and LAN verification information, used by the LSMF to verify the group to which the UE belongs.

Step 405. The LSMF determines a UE member list based on the LAN ID. Optionally, before determining the UE member list, the LSMF determines, based on the UE ID and the LAN verification information, whether the UE is an authorized user of the user group indicated by the LAN ID.

Step 406. The LSMF returns the UE member list to the SMF.

Step 407. The SMF generates a UE session routing forwarding policy based on the UE member list. The routing forwarding policy is used to instruct a UPF how to forward a user plane packet. The routing forwarding policy corresponds to the identifier of the user group, that is, only the user plane packet of the UE belonging to the user group is forwarded based on the routing forwarding policy.

A specific process is as follows. The SMF obtains, based on a second terminal list, a second session corresponding to a second terminal, and the SMF generates the routing forwarding policy, where the routing forwarding policy instructs the UPF to send, to second UE using a second PDU session, data received from a first PDU session.

Step 408. The SMF sends the routing forwarding policy to the UPF. The UPF performs subsequent packet forwarding for the UE based on the routing forwarding policy.

The foregoing mainly describes the solutions provided in the embodiments of this application from perspectives of interaction between network elements. It may be understood that, the network elements include corresponding hardware structures and/or software modules for performing the foregoing functions. A person skilled in the art should easily be aware that, in combination with the examples described in the embodiments disclosed in this specification, units, algorithms, and steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

Figure 5:
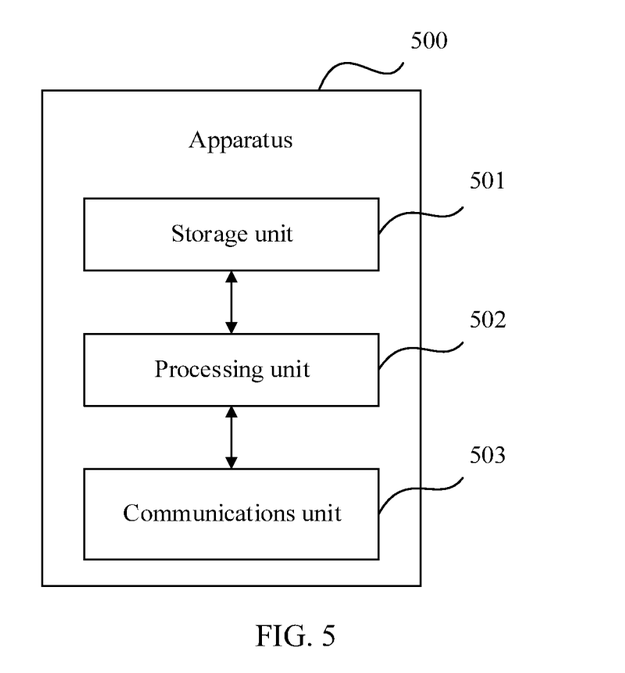
FIG. 5 is a schematic diagram of an apparatus according to an embodiment of this application.

When an integrated unit is used, FIG. 5 is a possible example block diagram of an apparatus 500 according to an embodiment of this application. The apparatus 500 may exist in a form of software, may be a session management network element, or may be a chip in the session management network element. The apparatus 500 includes a processing unit 502 and a communications unit 503. The communications unit 503 may include a receiving unit and a sending unit. The processing unit 502 is configured to control and manage behavior of the apparatus 500. The communications unit 503 is configured to support the apparatus 500 in communicating with another network entity (for example, a mobility management network element, a user plane network element, or a user group management network element). The apparatus 500 may further include a storage unit 501 configured to store program code and data of the apparatus 500.

The processing unit 502 may be a processor or a controller, such as a general-purpose central processing unit (CPU), a general-purpose processor, a digital signal processor (DSP), an application-specific integrated circuit (ASIC), a field-programmable gate array (FPGA), or another programmable logic device, a transistor logic device, a hardware component, or a combination thereof. The processor may implement or execute various example logical blocks, modules, and circuits described with reference to content disclosed in the embodiments of this application. The processor may be a combination for implementing a computing function, for example, a combination of one or more microprocessors, or a combination of the DSP and a microprocessor. The communications unit 503 may be a communications interface, a transceiver, a transceiver circuit, or the like. The communications interface is a general term. During specific implementation, the communications interface may include a plurality of interfaces. For example, the communications interface may include an interface between a session management network element and a mobility management network element, an interface between user plane network elements, an interface between user group management network elements, and/or another interface. The storage unit 501 may be a memory.

The processing unit 502 may support the apparatus 500 in performing the actions of the session management network element in the foregoing method examples. For example, the processing unit 502 may support the apparatus 500 in performing step 302 in FIG. 3, step 403 and step 407 in FIG. 4, and the like. The communications unit 503 may support communication between the apparatus 500 and another device. For example, the communications unit 503 may support the apparatus 500 in performing step 301, step 303, step 304, and step 305 in FIG. 3, and the like.

Figure 6:
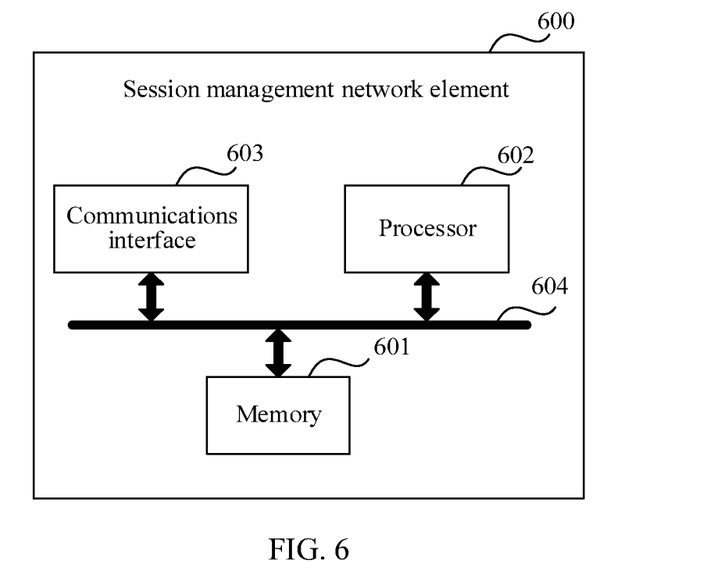
FIG. 6 is a schematic diagram of another apparatus according to an embodiment of this application.

When the processing unit 502 is a processor, the communications unit 503 is a communications interface, and the storage unit 501 is a memory, the apparatus 500 in this embodiment of this application may be a session management network element 600 shown in FIG. 6.

As shown in FIG. 6, the session management network element 600 includes a processor 602 and a communications interface 603. Optionally, the session management network element 600 may further include a memory 601. Optionally, the session management network element 600 may further include a bus 604. The communications interface 603, the processor 602, and the memory 601 may be connected to each other using the bus 604. The bus 604 may be a Peripheral Component Interconnect (PCI) bus, an Extended Industry Standard Architecture (EISA) bus, or the like. The bus 604 may be classified into an address bus, a data bus, a control bus, and the like. For ease of representation, only one thick line is used to represent the bus in FIG. 6, but this does not mean that there is only one bus or only one type of bus.

Figure 7:
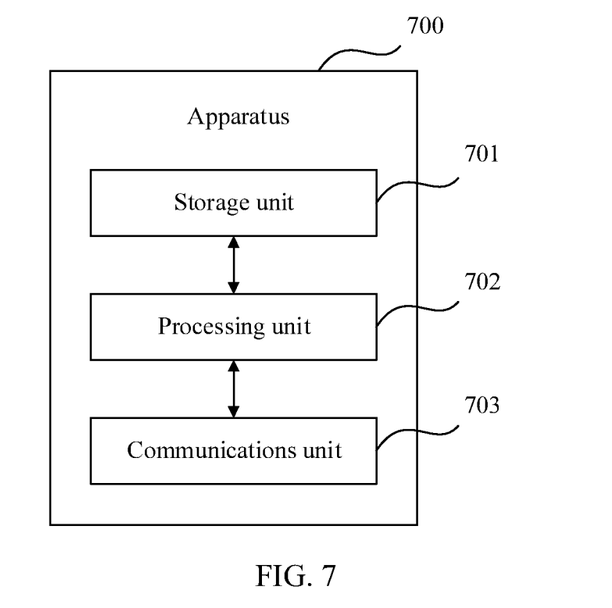
FIG. 7 is a schematic diagram of another apparatus according to an embodiment of this application.

When an integrated unit is used, FIG. 7 is a possible example block diagram of an apparatus 700 according to an embodiment of this application. The apparatus 700 may exist in a form of software, may be a user group management network element, or may be a chip in the user group management network element. The apparatus 700 includes a processing unit 702 and a communications unit 703. The communications unit 703 may include a receiving unit and a sending unit. The processing unit 702 is configured to control and manage behavior of the apparatus 700. The communications unit 703 is configured to support the apparatus 700 in communicating with another network entity (for example, a session management network element). The apparatus 700 may further include a storage unit 701 configured to store program code and data of the apparatus 700.

The processing unit 702 may be a processor or a controller, such as a CPU, a general-purpose processor, a DSP, an ASIC, an FPGA, or another programmable logic device, a transistor logic device, a hardware component, or any combination thereof. The processor may implement or execute various example logical blocks, modules, and circuits described with reference to content disclosed in the embodiments of this application. The processor may be a combination for implementing a computing function, for example, a combination of one or more microprocessors, or a combination of the DSP and a microprocessor. The communications unit 703 may be a communications interface, a transceiver, a transceiver circuit, or the like. The communications interface is a general term. During specific implementation, the communications interface may include a plurality of interfaces. For example, the communications interface may include an interface between a user group management network element and a session management network element, and/or another interface. The storage unit 701 may be a memory.

The processing unit 702 may support the apparatus 700 in performing the actions of the user group management network element in the foregoing method examples. For example, the processing unit 702 may support the apparatus 700 in performing step 405 in FIG. 4, and the like. The communications unit 703 may support communication between the apparatus 700 and an AMF, a UCF or a UDM. For example, the communications unit 703 may support the apparatus 700 in performing step 304 and step 305 in FIG. 3, step 404 and step 406 in FIG. 4, and the like.

Figure 8:
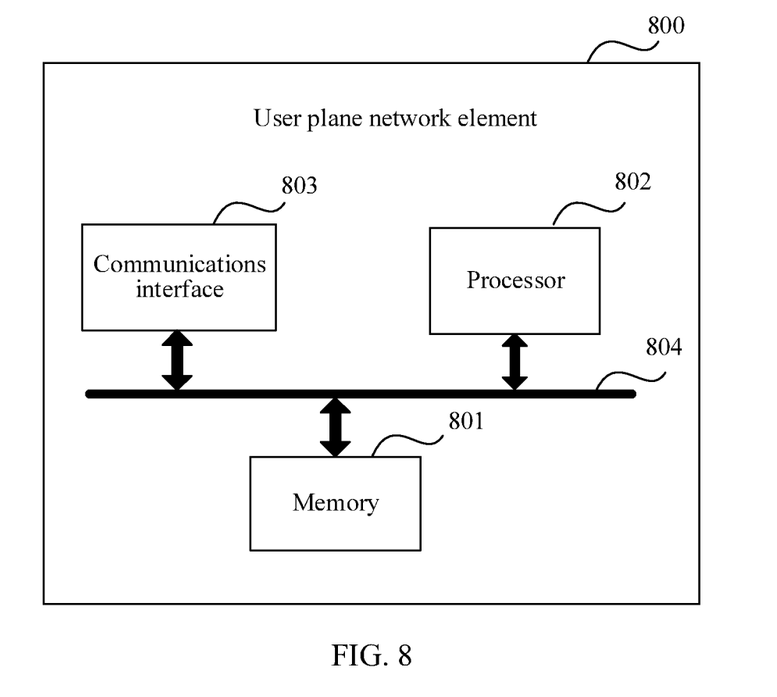
FIG. 8 is a schematic diagram of another apparatus according to an embodiment of this application.

When the processing unit 702 is a processor, the communications unit 703 is a communications interface, and the storage unit 701 is a memory, the apparatus 700 in this embodiment of this application may be a user group management network element 800 shown in FIG. 8.

As shown in FIG. 8, the user group management network element 800 includes a processor 802, a communications interface 803, and a memory 801. Optionally, the user group management network element 800 may further include a bus 804. The communications interface 803, the processor 802, and the memory 801 may be connected to each other using the bus 804. The bus 804 may be a PCI bus, an EISA bus, or the like. The bus 804 may be classified into an address bus, a data bus, a control bus, and the like. For ease of representation, only one thick line is used to represent the bus in FIG. 8, but this does not mean that there is only one bus or only one type of bus.

All or some of the foregoing embodiments may be implemented using software, hardware, firmware, or any combination thereof. When software is used to implement the embodiments, the embodiments may be implemented completely or partially in a form of a computer program product. The computer program product includes one or more computer program instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The various illustrative logical units and circuits described in the embodiments of this application may implement or operate the described functions using a general-purpose processor, a DSP, an ASIC, an FPGA or another programmable logical apparatus, a discrete gate or a transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a random-access memory (RAM), a flash memory, a read-only memory (ROM), an erasable programmable ROM (EPROM), an electrically EPROM (EEPROM), a register, a hard disk, a removable magnetic disk, a compact disc (CD) ROM (CD-ROM), or a storage medium of any other form in the art. For example, the storage medium may connect to a processor such that the processor may read information from the storage medium and write information to the storage medium. Optionally, the storage medium may further be integrated into a processor. The processor and the storage medium may be arranged in an ASIC, and the ASIC may be arranged in a terminal device. Optionally, the processor and the storage medium may also be arranged in different components of the terminal device.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although the present disclosure is described with reference to the embodiments, in a process of implementing the present disclosure that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), a computer-readable storage medium, or a computer program product. Therefore, the embodiments of this application may use a form of hardware only embodiments, software only embodiments, or embodiments with a combination of software and hardware. They are collectively referred to as "modules" or "systems".

A person skilled in the art may further understand that various illustrative logical blocks (illustrative logic block) and steps (step) that are listed in the embodiments of this application may be implemented using electronic hardware, computer software, or a combination thereof. Whether the functions are implemented using hardware or software depends on particular applications and a design requirement of the entire system. A person skilled in the art may use various methods to implement the described functions for each particular application, but it should not be considered that the implementation goes beyond the scope of the embodiments of this application.

Although the present disclosure is described with reference to specific features and the embodiments thereof, clearly, various modifications and combinations may be made to them without departing from the scope of the present disclosure. Correspondingly, the specification and accompanying drawings are merely example descriptions of the present disclosure defined by the appended claims, and are considered as any of or all modifications, variations, combinations or equivalents that cover the scope of the present disclosure. Clearly, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method, comprising:
receiving, by a session management network element, a first message from a mobility management network element, wherein the first message requests to establish a user group session for a first terminal, and wherein the first message comprises a first identifier of the first terminal and a second identifier of a user group;
generating, by the session management network element based on the second identifier, a routing forwarding policy for the first terminal; and
sending, by the session management network element, a second message to a user plane network element, wherein the second message comprises the routing forwarding policy to establish a first session for the first terminal.

2. The method of claim 1, wherein the first message is a protocol data unit (PDU) session establishment request message, and wherein the second identifier of the user group is a virtual network (VN) identifier (ID) or a data network name (DNN).

3. The method of claim 1, wherein generating the routing forwarding policy comprises:
obtaining, based on the second identifier, a second session corresponding to a second terminal, wherein the second terminal is a group member of the user group; and
generating, by the session management network element, the routing forwarding policy instructing the user plane network element to send, to the second terminal using the second session, data of the first terminal received from the first session.

4. The method of claim 1, further comprising:
obtaining, based on the second identifier, a terminal list comprising a plurality of third terminals in the user group; and
obtaining, based on the terminal list, a second session corresponding to a second terminal among the plurality of third terminals.

5. The method of claim 4, wherein obtaining the terminal list further comprises obtaining, from local information, the terminal list.

6. The method of claim 4, wherein obtaining the terminal list further comprises:
sending, by the session management network element, a third message to a user group management network element, wherein the third message requests group member information of the user group, and wherein the third message comprises the second identifier; and
receiving, by the session management network element, the terminal list from the user group management network element.

7. The method of claim 1, wherein the first message further comprises user group verification information of the first terminal, and wherein the method further comprises:
sending by the session management network element, the user group verification information to a user group management network element; and
receiving, from the user group management network element, indication information indicating that the first terminal is an authorized user of the user group.

8. A system comprising:
a session management network element configured to:
receive, from a mobility management network element, a first message requesting to establish a user group session for a first terminal, wherein the first message comprises a first identifier of the first terminal and a second identifier of a user group;
generate, based on the second identifier, a routing forwarding policy for the first terminal; and
send a second message comprising the routing forwarding policy; and
a user plane network element configured to:
receive the second message from the session management network element;
establish, based on the second message, a first session for the first terminal; and
forward, based on the routing forwarding policy, data of the first terminal received from the first session to a second terminal belonging to the user group.

9. The system of claim 8, wherein the first message is a protocol data unit (PDU) session establishment request message, and wherein the second identifier of the user group is a virtual network (VN) identifier (ID) or a data network name (DNN).

10. The system of claim 8, wherein the session management network element is further configured to obtain, based on the second identifier, a second session corresponding to the second terminal, and wherein the routing forwarding policy instructs the user plane network element to forward, to the second terminal using the second session, the data of the first terminal received from the first session.

11. The system of claim 8, wherein the session management network element is further configured to:
obtain, based on the second identifier, a terminal list of third terminals in the user group, wherein the third terminals comprise the second terminal; and
obtain, based on the terminal list, a second session corresponding to the second terminal.

12. The system of claim 11, wherein the session management network element is further configured to:
send, to a user group management network element, a third message requesting group member information of the user group, wherein the third message carries the second identifier; and
receive, from the user group management network element, the terminal list.

13. The system of claim 8, wherein the first message further comprises user group verification information of the first terminal, wherein the system further comprises a user group management network element, wherein the session management network element is further configured to send, to the user group management network element, the user group verification information, and wherein the user group management network element is configured to:
receive, from the session management network element, the user group verification information;
determine, based on the user group verification information, that the first terminal is an authorized user of the user group; and
send, to the session management network element, indication information indicating that the first terminal is the authorized user, and
wherein the session management network element is further configured to receive, from the user group management network element, the indication information.

14. A session management network element comprising:
a memory configured to store program instructions; and
a processor coupled to the memory, wherein the program instructions cause the processor to be configured to:
receive, from a mobility management network element, a first message requesting to establish a user group session for a first terminal, wherein the first message comprises a first identifier of the first terminal and a second identifier of a user group;

generate, based on the second identifier, a routing forwarding policy for the first terminal; and send, to a user plane network element, a second message comprising the routing forwarding policy to establish a first session for the first terminal.

15. The session management network element of claim 14, wherein the first message is a protocol data unit (PDU) session establishment request message, and wherein the second identifier of the user group is a virtual network (VN) identifier (ID) or a data network name (DNN).

16. The session management network element of claim 14, wherein the program instructions further cause the processor to be configured to:

obtain, based on the second identifier, a second session corresponding to a second terminal, wherein the second terminal is a group member of the user group; and further generate the routing forwarding policy instructing the user plane network element to send, to the second terminal using the second session, data of the first terminal received from the first session.

17. The session management network element of claim 14, wherein the program instructions further cause the processor to be configured to:

obtain, based on the second identifier, a terminal list comprising a plurality of third terminals in the user group; and obtain, based on the terminal list, a second session corresponding to a second terminal among the plurality of third terminals.

18. The session management network element of claim 17, wherein the program instructions further cause the processor to be configured to obtain, from local information, the terminal list.

19. The session management network element of claim 17, wherein the program instructions further cause the processor to be configured to:

send, to a user group management network element, a third message requesting group member information of the user group, wherein the third message comprises the second identifier; and receive, from the user group management network element, the terminal list.

20. The session management network element of claim 14, wherein the first message further comprises user group verification information of the first terminal, and wherein the program instructions further cause the processor to be configured to:

send the user group verification information to a user group management network element; and receive, from the user group management network element, indication information indicating that the first terminal is an authorized user of the user group.

* * * * *